| (12) United States Patent | (10) Patent No.: US 9,434,003 B2 |
|---|---|
| Zobl et al. | (45) Date of Patent: Sep. 6, 2016 |

(54) PROCESS FOR PRODUCING AN INTERCONNECTOR OF A HIGH-TEMPERATURE FUEL CELL

(75) Inventors: Gebhard Zobl, Schattwald (AT); Wolfgang Glatz, Reutte (AT); Wolfgang Kraussler, Weissenbach (AT); Robert Oberbreyer, Reutte (AT)

(73) Assignee: Plansee SE, Reutte (AT)

( * ) Notice: Subject to any disclaimer, the term of this patent is extended or adjusted under 35 U.S.C. 154(b) by 528 days.

(21) Appl. No.: 13/435,762

(22) Filed: Mar. 30, 2012

(65) Prior Publication Data

US 2012/0189484 A1 Jul. 26, 2012

Related U.S. Application Data

(63) Continuation of application No. 10/533,560, filed as application No. PCT/AT03/00217 on Jul. 30, 2003, now Pat. No. 8,173,063.

(30) Foreign Application Priority Data

Aug. 1, 2002 (AT) .......................... GM514/2002 U

(51) Int. Cl.
*B28B 3/08* (2006.01)
*B22F 3/16* (2006.01)
(Continued)

(52) U.S. Cl.
CPC ............... *B22F 3/164* (2013.01); *B22F 3/02* (2013.01); *B22F 5/00* (2013.01); *H01M 8/0208* (2013.01);
(Continued)

(58) Field of Classification Search
USPC .................................. 264/618, 667; 419/68
See application file for complete search history.

(56) References Cited

U.S. PATENT DOCUMENTS 4,647,414 A * 3/1987 Mizuno et al. ............... 264/667
5,639,572 A * 6/1997 Mori et al. .................... 429/123
(Continued)

FOREIGN PATENT DOCUMENTS

| CA | 2402515 A1 | 7/2002 |
|---|---|---|
| DE | 4237602 A1 | 11/1994 |

(Continued)

OTHER PUBLICATIONS

Köck, W., et al. "Development and Processing of Metallic Cr-Based Materials for SOFC Parts." Proc. 4th Internat. Symp. On Solid Oxide Fuel Cells, M. Dokiya, O. Yamamoto, H. Tagawa, and SC Singhal, Eds., Electrochemical Society (ECS). 1995.*

(Continued)

*Primary Examiner* — Angela Ortiz
*Assistant Examiner* — Russell Kemmerle, III
(74) *Attorney, Agent, or Firm* — Laurence A. Greenberg; Werner H. Stemer; Ralph E. Locher

(57) ABSTRACT

A molding is produced with a disk-shaped or plate-shaped basic body having a large number of knob-like and/or web-like elevations which merge into the basic body with inclined side surfaces. The molding is produced by pressing and sintering powdery raw materials close to the final shape. First, the boundary surfaces of the basic body are pressed to final shape as far as the transition regions of the elevations and the elevations are pressed to an oversize. The projection height of the elevations from the basic body is greater than the projection height in the finally pressed state. Their side surfaces form an angle of inclination in the range from 90°-150° with the respectively adjacent boundary surface of the basic body. Then the elevations are pressed to near final shape while the angle of inclination is enlarged to a greater value.

10 Claims, 3 Drawing Sheets

(51) Int. Cl.
    *B22F 3/02*      (2006.01)
    *B22F 5/00*      (2006.01)
    *H01M 8/02*      (2016.01)

(52) U.S. Cl.
    CPC ......... *H01M 8/0215* (2013.01); *H01M 8/0247* (2013.01); *B22F 2998/00* (2013.01); *B22F 2998/10* (2013.01); *Y02E 60/50* (2013.01)

(56) References Cited

U.S. PATENT DOCUMENTS

| | | | |
|---|---|---|---|
| 5,733,682 | A | 3/1998 | Quadakkers et al. |
| 5,795,502 | A * | 8/1998 | Terashi et al. ............. 252/521.1 |
| 6,316,136 | B1 | 11/2001 | Batawi |
| 6,517,338 | B1 | 2/2003 | Koga |
| 6,660,420 | B1 | 12/2003 | Yoshida et al. |
| 6,815,111 | B1 | 11/2004 | Yoshida |
| 7,390,456 | B2 * | 6/2008 | Glatz et al. ..................... 419/29 |
| 2002/0182468 | A1* | 12/2002 | Janousek et al. ................ 429/30 |
| 2006/0263669 | A1 | 11/2006 | Yoshida et al. |

FOREIGN PATENT DOCUMENTS

| | | |
|---|---|---|
| EP | 1033193 A1 | 9/2000 |
| EP | 1083034 A2 | 3/2001 |
| EP | 1195829 A2 | 10/2002 |
| WO | 0183132 A1 | 11/2001 |
| WO | 02055747 A1 | 7/2002 |
| WO | WO 02/055747 * | 7/2002 |

OTHER PUBLICATIONS

Janousek, M., et al. "Development and processing of chromium based alloys for structural parts in solid oxide fuel cells." Solid Oxide Fuel Cells V, The Electrochem. Society Proceedings Series PV (1997): 97-18.*

Glatz, W., et al. "A new low cost mass production route for metallic SOFC-interconnectors." Solid Oxide Fuel Cells VI, The Electrochem. Society Proceedings Series PV (1999): 99-19.*

ISR, dated Sep. 6, 2004.

Austrian Search Report, dated Mar. 4, 2003.

Höganas, "Handbook for Sintered Components", 1997.

* cited by examiner

PROCESS FOR PRODUCING AN INTERCONNECTOR OF A HIGH-TEMPERATURE FUEL CELL

CROSS-REFERENCE TO RELATED APPLICATION

This application is a continuation of patent application Ser. No. 10/533,560, filed May 20, 2005, now U.S. Pat. No. 8,173,063 B2, which was a national stage application of international application PCT/AT2003/000217, filed Jul. 30, 2003, which claimed the priority of Austrian application GM 514/2002, filed Aug. 1, 2002; the prior applications are herewith incorporated by reference in their entirety.

BACKGROUND OF THE INVENTION

Field of the Invention

The invention relates to a process for producing a molding, comprising a disk-like or plate-like basic body having a large number of knob-like and/or web-like elevations which merge into the basic body with inclined side surfaces, by means of pressing and sintering powdery raw materials close to the final shape.

Examples of such complexly shaped moldings are interconnectors, also designated bipolar plates or current collectors, of fuel cells. In addition to the most uniform possible density of these moldings and good dimensional stability, in order to ensure the gas tightness which is generally required, economic possible production of these moldings is also the basic precondition in order to permit fabrication on a production scale.

The production of the final shape of such moldings by means of material-removing machining from a semifinished product is very costly, so that fabrication by powder technology with shaping as close as possible to the final shape is to be aimed at. The problem in this case is that, in particular for interconnectors of high temperature fuel cells, alloys containing a high level of chromium are often used, which are brittle at lower temperatures and, in the form of powders, can be pressed only with very great difficulty.

Given simpler geometries of the moldings, a subdivision of the press die into a plurality of individual elements that can be moved independently of one another provides an improvement. In the case of interconnectors which, on a disk-like or plate-like basic body, often have several hundred knob-like or plate-like elevations, a practical subdivision of the press die is, however, technically no longer feasible.

The production of such components by means of powder injection molding techniques is likewise a problem because of the often inadequate material density and dimensional stability on account of excessively high and irregular shrinkage processes in the course of the production process.

European patent No. EP 1 195 829 describes a process for the production of a bipolar plate for fuel cells in which a gas-impermeable baseplate is connected to a large number of protrusions, which are intended to regulate the gas conduction. At the transition to the baseplate, the protrusions having inclined side surfaces, and in this case are produced, inter alia, by pressing a deformable compound with the aid of a profiled die in a single-staged pressing process.

This simple production process is sufficient for the bipolar plate specifically described, since the protrusions do not have to be too dense but can be porous and gas-permeable and are formed from an easily deformable compound comprising plastic-bonded fibers or filaments, for example of graphite. However, a production process of this type is not suitable for powdered raw materials which are difficult to press.

International patent application publication WO 01/83132 likewise describes a process for the production of a plate-like basic body having a large number of knob-like and web-like elevations, for example for use in fuel cells or in heat exchangers, inter alia also from powdery raw materials.

In this process, in a first step, an intermediate product is produced, which is substantially plate-like without the molded elevations but which already corresponds to the quantity of material of the finally shaped molded element. Then, with the aid of press dies, the shape close to the final shape of the molding is produced in a single step.

The disadvantage with a process of this type is that, when powdered raw materials are used, the compaction in the elevations is not very uniform and therefore zones with undesired porosity occur and/or the necessary pressing pressures are disproportionately high. In particular when pressing powders that are very difficult to press, it can occur that the pressing pressures are no longer sufficient, even in the largest presses which are currently available.

BRIEF SUMMARY OF THE INVENTION

The object of the present invention is, therefore, to provide a process for the production of moldings from a disk-like or plate-like basic body having a large number of knob-like and/or web-like elevations with which the moldings can be produced in a simple way, cost-effectively with adequate density and homogeneity, even in the case of powders which are difficult to press.

According to the invention, this is achieved in that the pressing is carried out in a two-stage pressing operation, in the first stage the boundary surfaces of the basic body being pressed to at least the approximate final shape as far as the transition regions of the elevations and, at the same time, the elevations being pressed to an oversize, specifically in such a way that their projection h' from the basic body is greater by 10%-150% as compared with the projection h from the basic body in the finally pressed state, and that their side surfaces form an angle of inclination $\alpha'$ in the range from 90°-150° with the respectively adjacent boundary surface of the basic body and, in the second stage, the elevations are pressed to at least approximately the final shape, in such a way that the angle of inclination $\alpha'$ is enlarged to a value $\alpha$ which lies in the range from 95°-170°.

The pressing process according to the invention will be used in particular during the production of moldings with unfavorable pressing relationships which are present when many individual subregions of the moldings have different dimensions in the pressing direction, which differ at least approximately in the ratio 1:2 in this direction. These relationships occur, for example, in the case of moldings with web-like and/or knob-like elevations, such as are used as interconnectors for fuel cells. The specific two-stage pressing process according to the invention operates with different press dies in each stage. In the first stage, the press dies, comprising at least an upper die and a lower die, are matched to each other in such a way that the boundary surfaces of the disk-like or plate-like basic body are compacted to the highest possible press density and then have at least approximately the desired final shape. Only the elastic spring-back occurring after the pressed object has been ejected from the female die and the shrinkage that occurs during the subsequent sintering change the dimensions of the pressed object in these regions, depending on the material used. The knob-like and/or web-like elevations, on the other hand, are not yet compacted to the highest possible press density in the first stage and therefore exhibit an oversize as compared with their final shape. In the second press stage, the press dies are matched to each other in such a way that the boundary surfaces of the disk-like or plate-like basic body are compacted only slightly or no longer compacted. The knob-like and/or web-like elevations, on the other hand, are compacted further to approximately the desired final shape by means of a specific enlargement of the angle of inclination and a reduction of the projection. In particular by means of this enlargement of the angle of inclination, the result in all the regions of a molding produced in such a way is very uniform, optimal compaction which, after the sintering of the molding, ensures adequate strength and gas-tightness of the molding. For specific complexly shaped moldings, in order to improve the homogeneity of the preform, it may be expedient to subdivide the individual press dies into a plurality of individual segments that can be moved independently of one another.

The knob-like and/or web-like elevations can be present both on one side and also on both sides of the disk-like or plate-like basic body, the use of the process according to the invention being particularly advantageous in the latter case in particular.

It has proven to be particularly worthwhile if the projection in the first press stage as compared with the projection in the finally pressed state is greater by 30% to 100%.

Furthermore, it has proven to be worthwhile to provide an angle of inclination in the range from 100° to 130° for the side surfaces of the elevations in the first pressing stage and in the range from 115° to 160° in the finally pressed state.

In particular when the process according to the invention is used on raw powders which are difficult to press, which need a certain proportion of pressing aids such as wax in order to improve the pressability, it may be advantageous to pre-sinter the pressed object after the press stage in order to remove the pressing aid. As a result, a density and freedom from pores of the finished molding which are again improved are achieved. In this case, depending on the raw material used, the pre-sintering can be carried out at temperatures between about 600° and 1200° during a time period of approximately one or several hours, depending, inter alia, on the size of the molding and the plant used. Raw powders which are easy to press, for example of aluminum or copper, generally do not need to be pre-sintered.

Interconnectors for high temperature fuel cells, such as solid electrolyte fuel cells, are often produced from alloys containing a high level of chromium, having at least 20% by weight of a chromium component, such as ferritic steels or chromium-based alloys. Since alloys of this type are difficult to press, the use of the process according to the invention has proven particularly worthwhile.

Use is often made for interconnectors of this type of chromium alloys which, in addition to chromium, consist of iron and further of one or more additional metallic and/or ceramic alloy components with a total of at most 40% by weight. Here, it has proven worthwhile to introduce the additional alloy components as a pre-alloy with chromium and/or iron into the powdery raw materials, which improves the pressability still further. In addition to these alloys based on chromium and iron, metal ceramics or ceramic materials, for example, can also be used as materials for interconnectors for high temperature fuel cells.

In the following text, the invention will be explained in more detail by using a production example and with reference to the figures.

DESCRIPTION OF A PREFERRED EMBODIMENT OF THE INVENTION

Production Example

Figure 1:
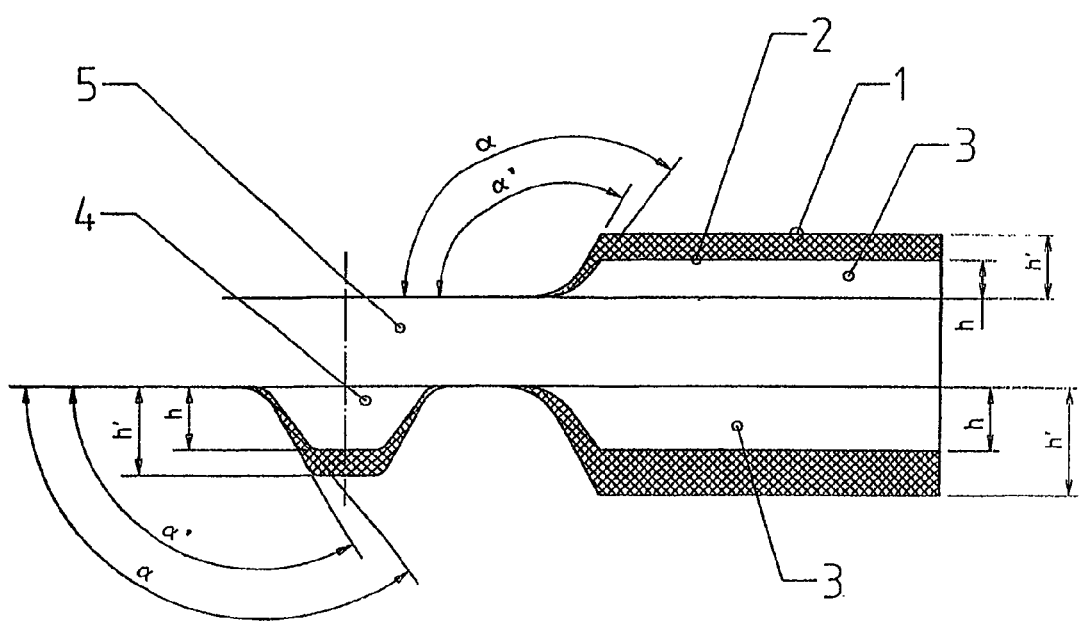
FIG. 1 is a schematic view on an enlarged scale of the edge section of an interconnector produced in accordance with the invention.

Disk-like interconnectors for high-temperature fuel cells made of a chromium-based alloy were produced by the process according to the invention. Dimensions and the shaping of the interconnectors are as follows:
 diameter 120 mm,
 total thickness 2.5 mm,
 central hole 8.8 mm diameter,
 basic body of 1.3 mm thickness,
 web-like elevations of about 0.5 mm and 5 mm width arranged on one side of the basic body around the central hole and in the edge region,
 web-like elevations of about 0.7 mm height and 5 mm width arranged on the opposite side of the basic body around the central hole and in the edge region,
 knob-like elevations in the form of a truncated cone with about 1.4 mm base area and 1 mm top area arranged therebetween at regular intervals and in rows,
 spacing between the individual knobs and rows about 1 mm, knob height 0.7 mm.

To produce the interconnectors, first of all an initial powder consisting of 95% by weight of elementary chromium powder and 5% by weight of a pre-alloyed powder of iron with 0.8% by weight of yttrium was prepared. The powder used had grain sizes in the range from 36 μm to 100 μm. The initial powders were produced by weighing in the individual powders and adding about 1% by weight of micro wax as a pressing aid and then 15 minutes of mixing in a tumbler mixer. The initial powder was put into the female die of a powder press.

FIG. 1 shows schematically on an enlarged scale the edge section of an interconnector produced in accordance with the invention in the pre-pressed state according to contour 1 and in the finally pressed state according to contour 2.

In the first pressing step, using appropriately shaped respectively one-piece upper and lower dies, the initial powder was compacted to the external contour 1 according to FIG. 1. In the process, the web-like elevations 3 and the knob-like elevations 4 were pressed with an oversize, while the boundary surface of the basic body 5 was pressed to approximately the final shape as far as the transition regions of the elevations 3, 4. The projection h' of the upper web-like elevations 3 from the basic body 5 was 66.7% greater as compared with their projection h from the basic body 5 in the finally pressed state, while the projection h' of the lower web-like elevations 3 from the basic body 5 was around 70% greater as compared with their projection h from the basic body 5 in the finally pressed state. The projection h' of the knob-like elevations 4 from the basic body 5 was around 28.6% greater as compared with their projection h in the finally pressed state. The angle of inclination α' of the side faces of the knob-like and web-like elevations 4, 3 was 1200.

After the first pressing step, the pressed object was ejected from the press die, removed and pre-sintered in a furnace at 1000° C. in a hydrogen atmosphere during a time period of 3 hours for the purpose of dewaxing. After that, the pre-sintered interconnectors were inserted into a modified die of the powder press in order to carry out the second pressing step. In this case, the die was modified in terms of its dimensions such that its diameter corresponded to the dimensional change of the pre-sintered interconnectors in diameter, which was brought about by the resilient spring-back of the pressed object after being ejected from the die following the first pressing step and the sintering shrinkage in the pre-sintering step. This dimensional change depends on the size of the pressed object produced and on the type of material used. In the present case, the diameter of the die had to be designed 0.3 mm larger for the second pressing step. Accordingly, the dimensional changes in the spacings of the knob-like and the web-like elevations 4, 3 also had to be taken into account when designing the upper and lower dies for the second pressing step. Furthermore, the upper and lower dies were matched in such a way that, following the second pressing step, the interconnectors, including the web-like and knob-like elevations 3, 4 were present to the greatest extent in the final dimensions. To the greatest extent means that the shrinkage of the final sintering step was also taken into account, so that following the sintering the final dimension was present. In order to carry out the second pressing step, the press dies were also designed in such a way that the angle of inclination a of the side surfaces of the web-like and knob-like elevations 3, 4 had been enlarged with respect to the angle of inclination α' in the first pressing step, specifically to 127.5°. This enlargement of the angle of inclination results in optimal compaction of the web-like and knob-like elevations 3, 4. At the same time, the material begins to flow and also effects additional compaction of the basic body 5. After the second pressing step, the interconnectors were subjected to sintering in hydrogen at 1450° C. for three hours for the purpose of further compaction and for the purpose of complete chemical homogenization.

Figure 2A:
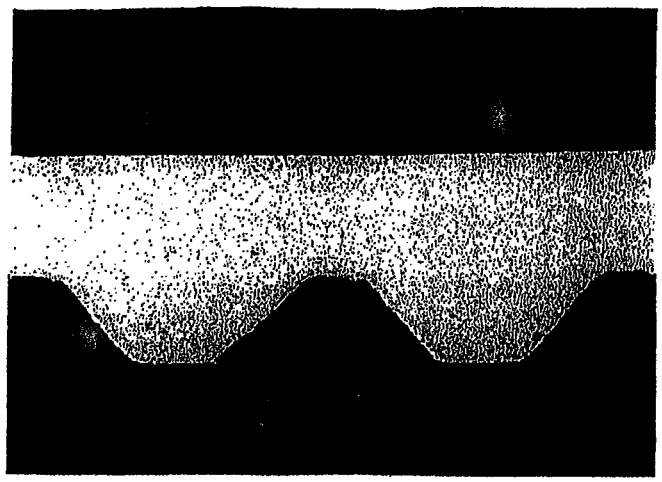
FIGS. 2A and 2B show metallographs of an interconnector produced in accordance with the invention in a 15-fold enlargement.
Figure 2B:
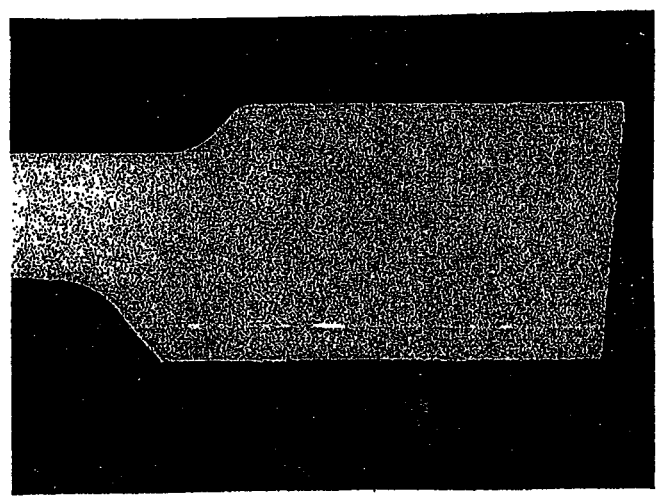

For the purpose of comparison, interconnectors of the same material and with the same dimensions were produced by single-stage pressing according to the prior art. The remaining production conditions were the same as in the interconnectors produced in accordance with the invention, except that the dewaxing was carried out as a prior stage in the course of the sintering process. FIGS. 2A and 2B show the metallographs of an interconnector produced in accordance with the invention in a 15-fold enlargement, FIG. 2A reproducing the region of the knob-like elevations 4 and FIG. 2B the region of the web-like elevations 3.

Figure 3A:
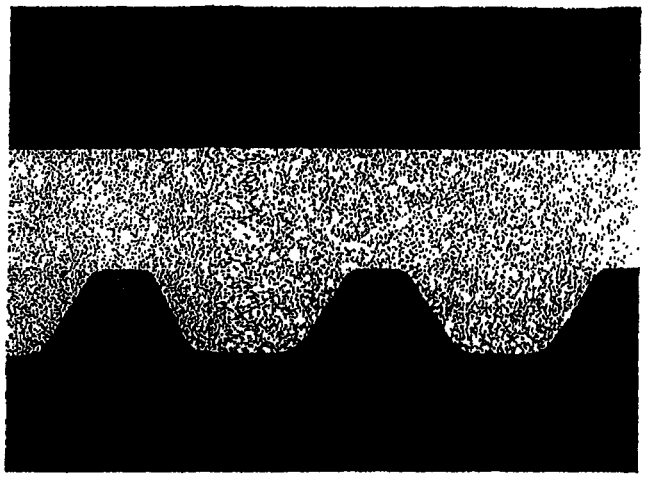
FIGS. 3A and 3B show the corresponding metallographs of an interconnector which was produced in accordance with the prior art.
Figure 3B:
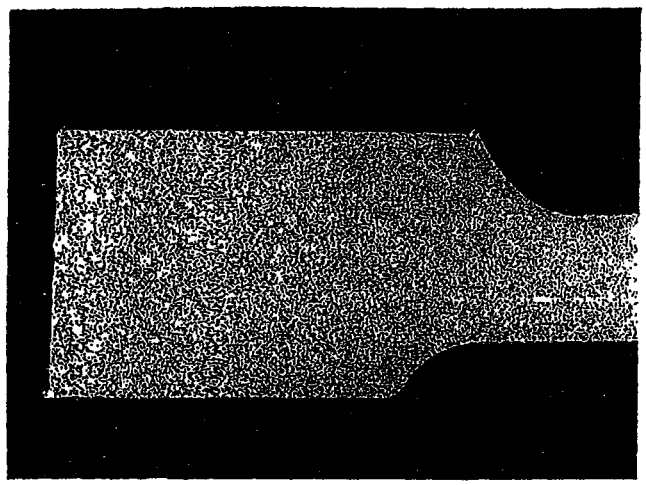

FIGS. 3A and 3B show the corresponding metallographs of an interconnector which was produced in accordance with the prior art, using a single-stage pressing process. The greater homogeneity and freedom from pores, and therefore the greater density, of the interconnector produced in accordance with the invention can be seen clearly in virtually all regions.

The invention claimed is:
1. A process of producing an interconnector for a high-temperature fuel cell, the process comprising:
providing a powder press with dies substantially corresponding to a final shape of the interconnector, with a basic body having a multiplicity of elevations projecting from the basic body with inclined side surfaces;
providing a chromium-based powder containing elemental chromium and filling the powder into a female die of the powder press;
pressing the chromium-based powder to form the basic body having a shape of a disk or a plate with the elevations defining flow channels of the high-temperature fuel cell and the elevations rising from the basic body with inclined side surfaces having an angle of inclination of between 115° and 160°;
subsequently ejecting the basic body from the dies of the powder press and sintering to form the interconnector; and
performing the pressing with parameters of the powder press such that, after sintering, the interconnector has a substantially uniform density throughout the basic body and the elevations, and the density is sufficient to render the interconnector suitable for use in a solid oxide fuel cell.

2. The process according to claim 1, which comprises forming the elevations as web-shaped or knob-shaped elevations projecting from the basic body with inclined side surfaces.

3. The process according to claim 1, wherein the pressing step is a multi-stage pressing step including a first pressing stage and a second pressing stage each performed with mutually different dies, and wherein:
the first pressing stage comprises pressing boundary surfaces of the basic body to near final shape as far as transition regions of the elevations and simultaneously pressing the elevations to an oversize, defined with a projection height h' from the basic body being greater than a projection height h from the basic body in a finally pressed state by 10%-150%, and with side surfaces of the elevations enclosing an angle of inclination α' in a range from 90°-150° with a respectively adjacent boundary surface of the basic body; and
the second pressing stage comprises pressing the elevations to near final shape and thereby increasing the angle of inclination α' to the angle of inclination of between 115° and 160°.

4. The process according to claim 3, which comprises forming the projection height h' by 30%-100% greater than the final projection height h in the finally pressed state.

5. The process according to claim 3, which comprises forming the angle of inclination α' within a range from 110° to 130°, and forming the angle of inclination α within a range from 115° to 160°.

6. The process according to claim 3, which comprises mixing the powder with an amount of pressing aid wax and pre-sintering subsequently to the first pressing stage.

7. The process according to claim 1, wherein the chromium-based powder contains the elemental chromium, an iron component, and one or more additional metallic and/or ceramic alloy components of a total of at most 40% by weight, and which comprises introducing the additional alloy components into the powdery raw materials as a pre-alloy with iron.

8. A process for producing a molding with a basic body having a multiplicity of elevations merging into the basic body with inclined side surfaces, the method which comprises the following steps:
providing a chromium-based powder containing elemental chromium and pressing the chromium-based powder in a two-stage pressing operation with a first pressing stage and a subsequent, second pressing stage; and in the first pressing stage, providing the powder press with a first set of dies and pressing the chromium-based powder, wherein the dies are set to press the elevations with a defined oversize resulting from the first pressing stage with:
- a projection height h' from the basic body greater than a projection height h from the basic body in a finally pressed state by 10%-150%; and
- side surfaces of the elevations enclosing an angle of inclination α' between 90° and 150° with a respectively adjacent boundary surface of the basic body;

in the second pressing stage, providing the powder press with a second set of dies, different from the first set of dies, and pressing the elevations with the second dies to near final shape, by reducing the height of the elevations from the height h' to the height h by a greater amount than a reduction in a thickness of the basic body in the adjacent boundary surfaces and by increasing the angle of inclination α' to a value a in a range from 95°-170°; and subsequently sintering the basic body to produce the molding.

9. The process according to claim 8, which comprises mixing the powder with a minor amount of micro wax and pre-sintering subsequently to the first pressing stage.

10. A process of producing an interconnector for a high-temperature fuel cell, the process comprising:
- providing a powder press with dies substantially corresponding to a final shape of the interconnector, with a basic body having a multiplicity of elevations projecting from the basic body with inclined side surfaces;
- providing a chromium-based powder containing a major proportion of elemental chromium and a minor proportion of at least one additional alloying metal, and filling the powder into a female die of the powder press;
- pressing the chromium-based powder to form the basic body having a shape of a disk or a plate with the elevations defining flow channels of the high-temperature fuel cell and the elevations rising from the basic body with inclined side surfaces having an angle of inclination of between 115° and 160°;
- subsequently ejecting the basic body from the dies of the powder press and sintering to form the interconnector for the high-temperature fuel cell.

* * * * *

UNITED STATES PATENT AND TRADEMARK OFFICE
CERTIFICATE OF CORRECTION

PATENT NO.       : 9,434,003 B2
APPLICATION NO.  : 13/435762
DATED            : September 6, 2016
INVENTOR(S)      : Gebhard Zobl et al.

Page 1 of 1

It is certified that error appears in the above-identified patent and that said Letters Patent is hereby corrected as shown below:

In the Claims

Claim 8, column 7, line 19 should read:

angle of inclination $\alpha'$ to a value $\alpha$ in a range from

Signed and Sealed this
Twentieth Day of December, 2016

Michelle K. Lee
*Director of the United States Patent and Trademark Office*